Jan. 21, 1958  R. J. COAR  2,820,435
PRESSURE RESPONSIVE CONTROL DEVICE
Original Filed Nov. 18, 1950  4 Sheets-Sheet 2

INVENTOR
RICHARD J. COAR
BY Jack N. McCarthy
AGENT

INVENTOR
RICHARD J. COAR
BY Jack N. McCarthy
AGENT

Jan. 21, 1958              R. J. COAR              2,820,435

PRESSURE RESPONSIVE CONTROL DEVICE

Original Filed Nov. 18, 1950              4 Sheets-Sheet 4

INVENTOR
RICHARD J. COAR
BY Jack N. McCarthy
AGENT

United States Patent Office 2,820,435
Patented Jan. 21, 1958

2,820,435

PRESSURE RESPONSIVE CONTROL DEVICE

Richard J. Coar, West Hartford, Conn., assignor to United Aircraft Corporation, East Hartford, Conn., a corporation of Delaware Original application November 18, 1950, Serial No. 196,424. Divided and this application November 29, 1952, Serial No. 323,208

15 Claims. (Cl. 121—46.5)

This invention is a division of application Serial No. 196,424, filed November 18, 1950, to Richard J. Coar now Patent No. 2,715,311 for a Multiple Pressure Responsive Control Device for a Variable Area Nozzle of a Jet Engine and relates to a device which will sense the ratio between two absolute pressures.

An object of this invention is to provide a device which will indicate the ratio between two absolute pressures.

Another object of this invention is to provide a device which is sensitive to a ratio between two absolute pressures above or below a predetermined value.

A further object of this invention is to provide a device which will provide for the actuation of another device in accordance with the change of ratio between two absolute pressures above or below a predetermined value.

Further objects and advantages will be apparent from the following specification and drawings.

Figure 3:
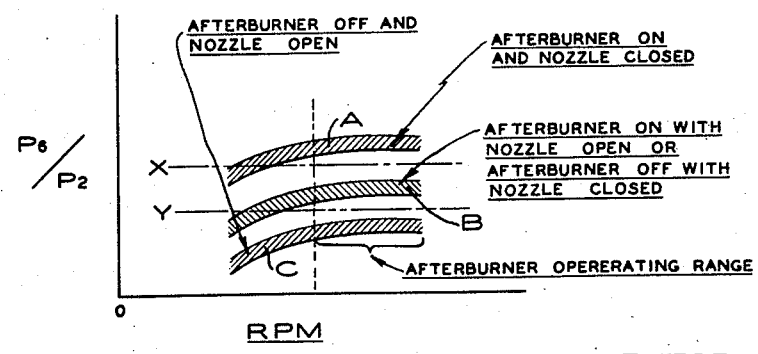

Fig. 3 is a view showing the relationship of the ratio between turbine discharge gas pressure ($P_6$) and compressor inlet pressure ($P_2$) versus engine R. P. M. for various conditions.

Figure 4:
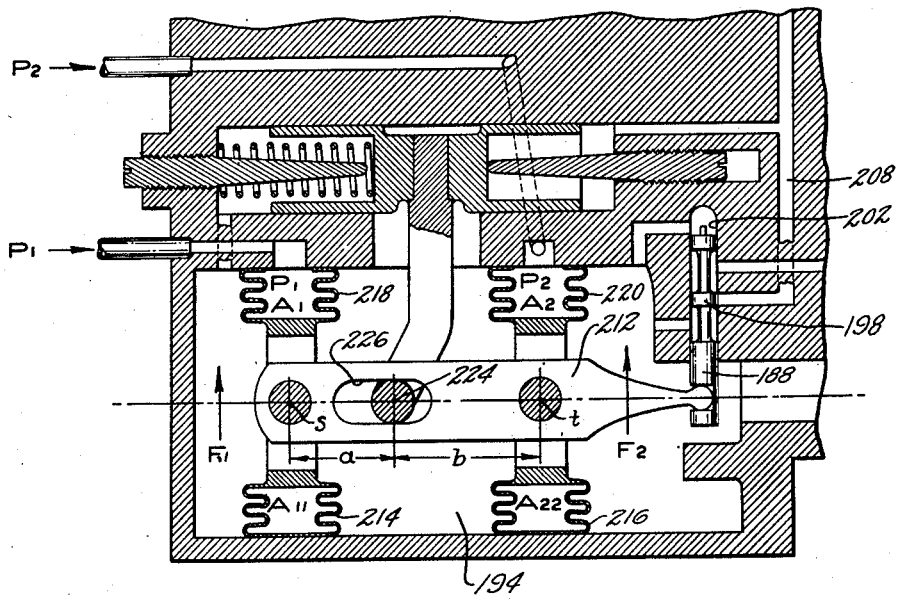

Fig. 4 is an enlarged schematic view showing the actuating mechanism of the control.

Figure 5:
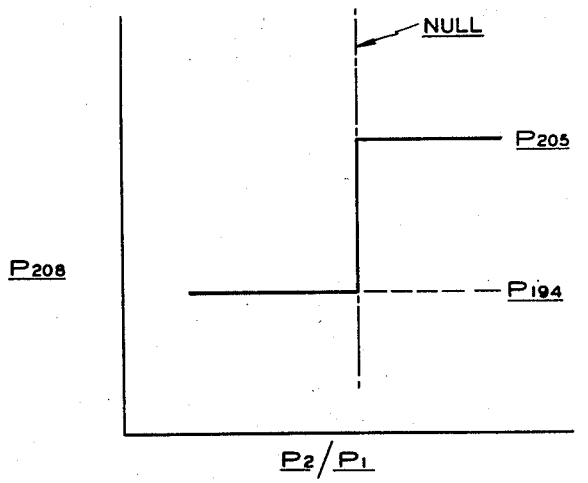

Fig. 5 is a chart showing the relation of the pressure in passage 208 on either side of the "null" position of the actuating mechanism of the control.

Figure 6:
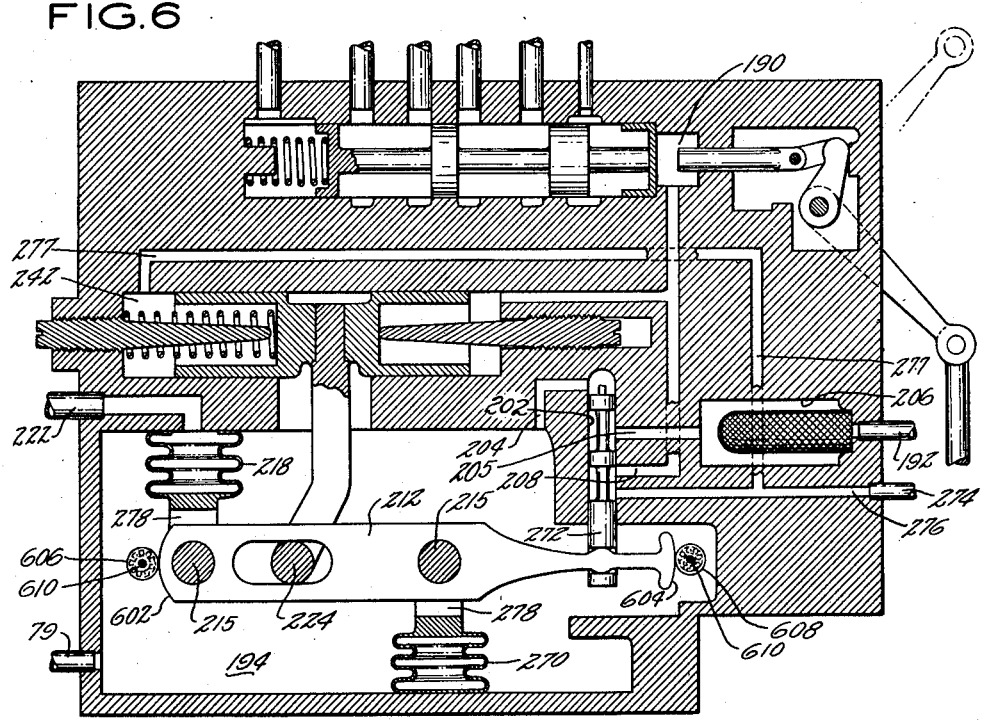

Fig. 6 is an enlarged schematic view of a modification of the exhaust nozzle actuator control.

Figure 7:
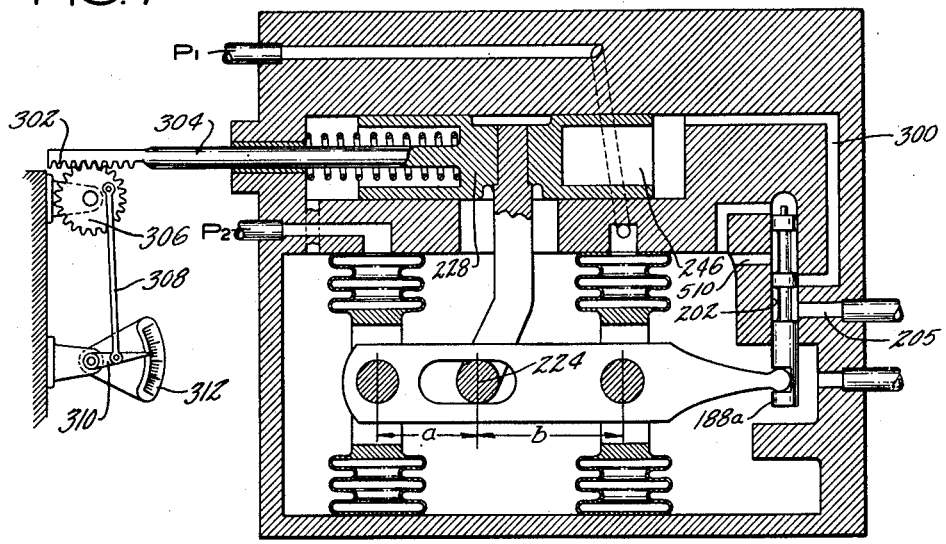

Fig. 7 is a schematic view of the actuating mechanism of the control modified to measure the ratio to which it is sensitive.

Figure 1:
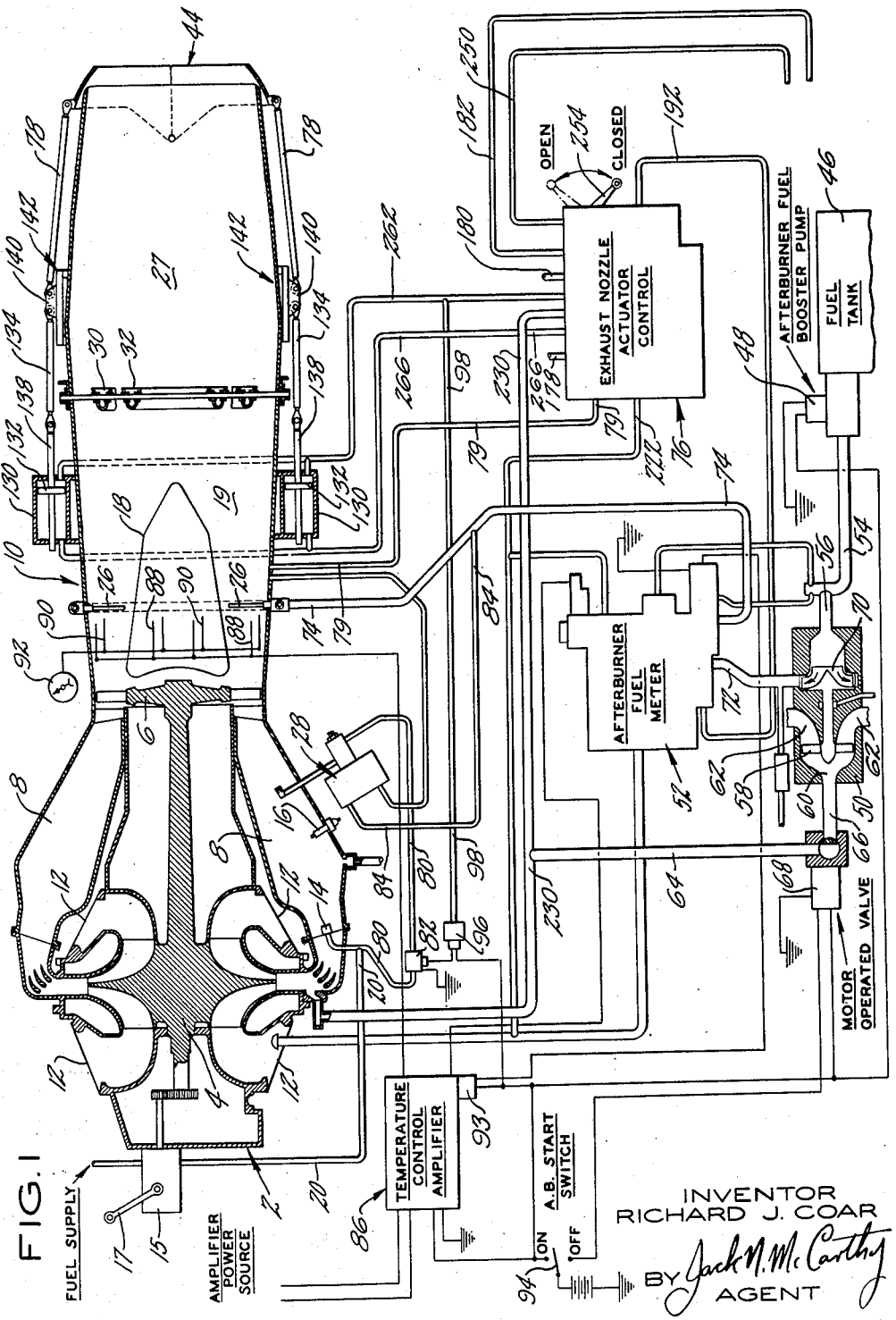
Fig. 1 is a schematic view of a turbojet engine including an afterburner showing the exhaust nozzle actuator control.

With reference to Fig. 1, the turbojet engine 2 has a compressor 4, which, in the arrangement shown, is a centrifugal type, driven by a turbine 6. Combustion chambers 8 therebetween deliver air from the compressor to the turbine. An afterburner 10 is attached at the turbine outlet to provide a means of increasing the thrust.

The engine 2 has two axially-spaced annular intake openings 12 to direct the incoming air into the two oppositely facing annular compressor inlets. Compressed air discharging from the compressor 4 passes to the turbine through the combustion chambers 8 where it is mixed with fuel from fuel nozzles 14. These fuel nozzles 14 receive fuel from the governor 15 through conduit 20. The fuel-air mixture is initially ignited within the combustion chambers 8 by a spark igniter 16. The governor 15 maintains the rotative speed of the turbine rotor assembly in accordance with the value selected by the power lever 17 by controlling fuel flow supplied through conduit 20 and nozzles 14 to the combustion chambers 8.

From the turbine, the gases pass around a cone 18 into the diffuser section 19 of the afterburner. When the afterburner is operating, fuel is discharged into these gases from a plurality of fuel nozzles 26 located in the diffuser 19. Since the gases leaving the turbine 6 contain considerable unburned oxygen, the additional fuel introduced by fuel nozzles 26 provides a combustible mixture which may be initially ignited within combustion chamber 27 by ignition means hereinafter described, which may be the type shown and claimed in the co-pending applications Serial No. 196,402, filed November 18, 1950, now Patent No. 2,780,055 issued February 5, 1957 and Serial No. 196,426, filed November 18, 1950. The burning of this combustible mixture is stabilized in the combustion chamber 27 of the afterburner by flameholders 30 and 32. The burned gases discharge from the engine through the nozzle 44 whose area can be varied.

The variable nozzle 44 operates between a minimum opening for engine operation without afterburning and a maximum opening for operation of the engine with afterburning. A nozzle and actuating system, similar to the one shown with this invention, is shown and claimed in co-pending application Serial No. 193,734, filed November 2, 1950, now Patent No. 2,714,285. The actuating system consists of the cylinder 130, piston 132, connecting control rod 134, nozzle control rod 78, piston rod 138, a car 140, and a track mechanism 142 for said car.

The afterburner control system can be divided into three main parts. They are the following: (1) the fuel system, (2) the ignition means, and (3) the exhaust nozzle actuator control. These three parts are closely coordinated by fluid conduit connections and an electrical system.

The fuel system includes the fuel tank 46, the fuel booster pump 48, the fuel pump 50, the fuel meter 52 and the fuel nozzles 26. The fuel booster pump 48 is mounted on the fuel tank 46 and is connected to the fuel pump 50 by conduits 54 and 56. The fuel pump 50 is of the turbine type having a turbine rotor 58 mounted therein with an intake passage 60 and exhaust passages 62 for the working fluid. The working fluid, which is shown as compressed air supplied from the compressor outlet of the engine, is delivered to the intake passage 60 by conduits 230, 64 and 66. A motor operated valve 68 is located at the junction of conduits 64 and 66 to control the operation of the fuel pump by controlling the flow of compressed air to the turbine of the pump. The turbine rotor 58 drives an impeller 70 which provides the pumping action. The fuel pump 50 delivers fuel to the fuel meter 52 through conduit 72. The fuel meter 52 meters the fuel therein and injects it into the engine through conduit 74 and nozzles 26. The fuel meter represented herein may be any one of many types some of which are shown and claimed in co-pending applications Serial No. 196,423, filed November 18, 1950, and Serial No. 196,414, filed November 18, 1950, now Patent No. 2,714,803 issued August 9, 1955.

The exhaust nozzle actuator control 76 connects pressures to the exhaust nozzle actuating cylinders 130 by a pressure relay valve 168 (see Fig. 2) either to open or to close the exhaust nozzle as required. This relay valve 168 has three lands, 170, 172 and 174 which guide the valve in its cylinder bore 176. The cylinder bore 176 has six passages connected thereto. They are from left to right in Fig. 2, a vent 178 to low pressure supply which may be compressor inlet pressure, a conduit 266 connected at its other end to the end of the cylinder 130 away from the nozzle, a conduit 230 which is connected at its other end to a high pressure supply shown as compressor discharge pressure, a conduit 262 which is connected at its other end to the end of the cylinders 130 nearest the nozzle, a vent 180 to low pressure supply, and a conduit 182 which serves as a drain. A spring 184 biases relay valve 168 to the right against one side of a piston cap 186. Piston cap 186 forms a chamber 190 with a bore 191.

A pilot valve 188 connects chamber 190 either with a line 192 which supplies a source of fluid pressure or with a chamber 194 which is connected via conduits 250 and 252 to a low reference pressure. To prevent the nozzle 44 from opening in a non-afterburning range (see Fig. 3) the source of fluid pressure for line 192 is from a point in the afterburner fuel system downstream of the afterburner fuel pump. The pilot valve 188 has three lands, 196, 198 and 200, and moves axially in a cylinder bore 202. This cylinder bore has four passages connected thereto. Starting from the top in Fig. 2 they are, a passage 204 which is connected at its other end to chamber 194, a passage 205 which is connected at its other end to a chamber 206 which is in turn connected to passage 192, a passage 208 which is connected at its other end to chamber 190, and a passage 210 which is connected at its other end to chamber 194.

Pilot valve 188 is connected at its lower end to one end of a walking beam 212 located in chamber 194. This walking beam 212 is connected near each end between two bellows. Each set of bellows is attached by a slotted member 213 through which the walking beam 212 passes. A pin 215 pivotally attaches the walking beam at each end to member 213 of each set of bellows. The lower bellows at each end, 214 and 216, are evacuated.

Pressures at two different stations along the flow path of the gases through the power plant are used by the control 76 to sense combustion within the afterburner and to regulate the propelling nozzle accordingly. As shown in Fig. 1, these stations are the compressor inlet pressure which is connected by conduit 222 to bellows 218, located above bellows 214, and the turbine discharge pressure which is connected by conduit 79 to bellows 220, located above bellows 216. Other stations, such as those described and claimed in co-pending application Serial No. 196,425, filed November 18, 1950, now Patent No. 2,780,054, may be used.

A movable fulcrum 224 supports the walking beam 212 within a slot 226. A fulcrum shift piston 228 is located in bore 430 in control 76 above chamber 194. An arm 232 is connected at one end to the fulcrum shift piston 228 and at its other end to the fulcrum 224. The arm 232 passes through a slot 234 which connects bore 430 and chamber 194. The piston 228 can travel between two adjustment screws, a "nozzle closing" adjustment screw 236 and a "nozzle opening" adjustment screw 238. The "nozzle opening" adjustment screw 238 sets the value of the ratio of the pressures at the two different stations, represented by line X in Fig. 3, which value the ratio has to exceed to open the nozzle 44 when the two pressure stations shown in Fig. 1 are used. The "nozzle closing" adjustment screw 236 sets the value of the ratio of the pressures at the two different stations represented by line Y in Fig. 3, which value the ratio has to drop below to close the nozzle 44 when the two pressure stations shown in Fig. 1 are used.

A spring 240 biases piston 228 to the right against the "nozzle opening" adjustment screw 238. The chamber 242 formed by the bore 430 and the left end of the piston 228 is connected to chamber 194 by passage 244. The chamber 246 formed by the bore 430 and the right end of the piston 228 is connected to passage 208 by passage 248.

A manually operated control is provided to actuate the relay valve 168 in the event the automatic functioning of nozzle control 76 fails. This manual control consists of a bell lever 254 pivoted at 256, a link 258 and an actuating rod 260. Limit stops 264 and 268 are provided.

The igniter control 28 injects an amount of fuel in addition to that normally supplied into a combustion chamber 8 where it is ignited resulting in flame propagation through the turbine into the afterburner for igniting a combustible mixture in the afterburner. Fuel is provided to the igniter control 28 from the main fuel system by conduit 80 which has a solenoid actuated shut-off valve 82 connected therein. The igniter control is connected by conduit 84 to conduit 74 which provides the actuating pressure to inject the additional fuel to provide ignition in the afterburner.

The electrical system may include a temperature control amplifier 86 which during afterburner operation is sent a signal by thermocouples 88 which sense turbine discharge temperature. Thermocouples 90 also sense turbine temperature but send their signal to a temperature gage 92. This amplifier when energized sends a signal to the fuel meter 52 to attenuate fuel flow in accordance with some engine performance variable such as turbine discharge temperature and may also control the operation of a normally closed solenoid operated shut-off valve in the fuel meter 52. In the event excessive temperatures are reached at the turbine discharge the switch 93 will operate to permit the shut-off valve in the fuel meter to close. The afterburner switch 94 controls the amplifier 86, sets the motor operated valve 68, controls the fuel booster pump 48, and controls the opening of normally closed solenoid actuated shut-off valve 82. While the attenuation of fuel flow has been described as being done by automatic means, it may be done manually if desired, watching gage 92 to regulate the temperature.

Since the actuating mechanism of this control 76 is responsive to the ratio of two absolute pressures it is shown that the pilot valve 188 of the control is moved relative to a "null" position, to be defined later, independently of either pressure. With reference to Fig. 4, the bellows 218 and 214 are equal in effective area ($A_1 = A_{11}$) and the bellows 220 and 216 are equal in effective area ($A_2 = A_{22}$) to eliminate any unbalance from the pressure in chamber 194. As the pilot valve is hydraulically balanced, its motion is controlled by the balance of forces applied to the walking beam 212 by the four bellows, 214, 216, 218, and 220. Land 198 on the pilot valve 188 cooperates with the end of passage 208 in bore 202 to provide either low pressure or a high pressure in conduit 208 whenever the pilot valve is infinitesimally moved in one direction or another from what may be defined as a "null" position of the pilot valve. The output of the actuating mechanism of the control is, therefore, a high pressure or a low pressure in conduit 208 depending respectively upon whether the ratio of the pressure in bellows 218 to the pressure in bellows 220 is less than or more than the value established by the position of fulcrum 224.

Considering the balance of forces when the pilot valve 188 is at its "null" position, if $P_1$ and $P_2$ represent the absolute pressures at two appropriate stations in the gas flow through the engine, and $a$ represents the distance between the point of application $s$ of bellows 214 and 218 to the walking beam and fulcrum 224 and $b$ represents the distance between the point of application $t$ of bellows 216 and 220 to the walking beam and fulcrum 224, taking moments about the fulcrum 224 we may write:

$$(P_1 A_1 - F_1)a = (P_2 A_2 - F_2)b$$

Or (1) $$\frac{P_1 A_1 - F_1}{P_2 A_2 - F_2} = \frac{b}{a}$$

where $F_1$ and $F_2$ represent mechanical spring forces contributed by the bellows, taken as positive forces when opposing the absolute pressures $P_1$ and $P_2$.

Equation 1 may be rewritten:

(2) $$\frac{P_1 A_1}{P_2 A_2} = \frac{b}{a} + \left[\frac{F_1 - \frac{b}{a}F_2}{P_2 A_2}\right]$$

From this equation it is apparent that a definition of the force balance existing when the pilot valve is at "null," in terms of the pressure ratio $P_1/P_2$, is independent of the pressure $P_1$ but is independent of the pressure $P_2$ only when $F_1/F_2=b/a$. In certain cases it may be desired to use the bellows spring forces $F_1$ and $F_2$ to obtain a variation in the ratio $P_1/P_2$ at "null" as a function of $P_2$. In the general case, however, where the pressure ratio setting is desired independent of both pressure $P_1$ and pressure $P_2$ it is required that $F_1/F_2=b/a$ to establish this independence. If $F_1$ and $F_2$ are established to make $F_1/F_2=b/a$ at one particular value of $b/a$, it is obvious that $F_1/F_2$ will not equal $b/a$ at some other value of $b/a$. It is apparent, therefore, that the "null" point pressure ratio setting can be made independent of $P_1$ and $P_2$ for all values of $b/a$ only by making $F_1=F_2=0$. Then (3) $$\frac{P_1 A_1}{P_2 A_2} = \frac{b}{a} \text{ or } \left(\frac{P_1}{P_2}\right)_{null} = \frac{b}{a}\left(\frac{A_2}{A_1}\right)$$

It is apparent that as fulcrum 224 is moved to change the pressure ratio seting, the mechanical forces $F_1$ and $F_2$ contributed by the bellows must remain zero. This requires that the locus of fulcrum 224 relative to the walking beam be such that with the pilot valve 188 at "null" position no motion of points $s$ or $t$ results when the fulcrum 224 is moved; otherwise the mechanical resilience of the bellows would reestablish finite values of $F_1$ and $F_2$. In the arrangement disclosed these requirements are met by making the slot 226 in the walking beam parallel to the center line $s$—$t$ and by moving fulcrum 224 in a line parallel to, and displaced to locate, center line $s$—$t$ such that the pilot valve remains at its "null" position when the bellows forces $F_1$ ans $F_2$ equal zero.

From Figure 5 it is further apparent that when the pressure ratio $P_2/P_1$ is in excess of $(P_2/P_1)$ null the unbalance then resultant in the forces acting on the walking beam cause the walking beam to rotate in a clockwise direction about the fulcrum 224 and displace the pilot valve to move away from its "null" position in the direction such that pressure from conduit 205 is supplied to the output passage 208. In a like manner when the pressure ratio $P_2/P_1$ is less than $(P_2/P_1)$ null as defined by Equation 3, the pilot valve is displaced to provide the low reference pressure of chamber 194 in passage 208.

Figure 2:
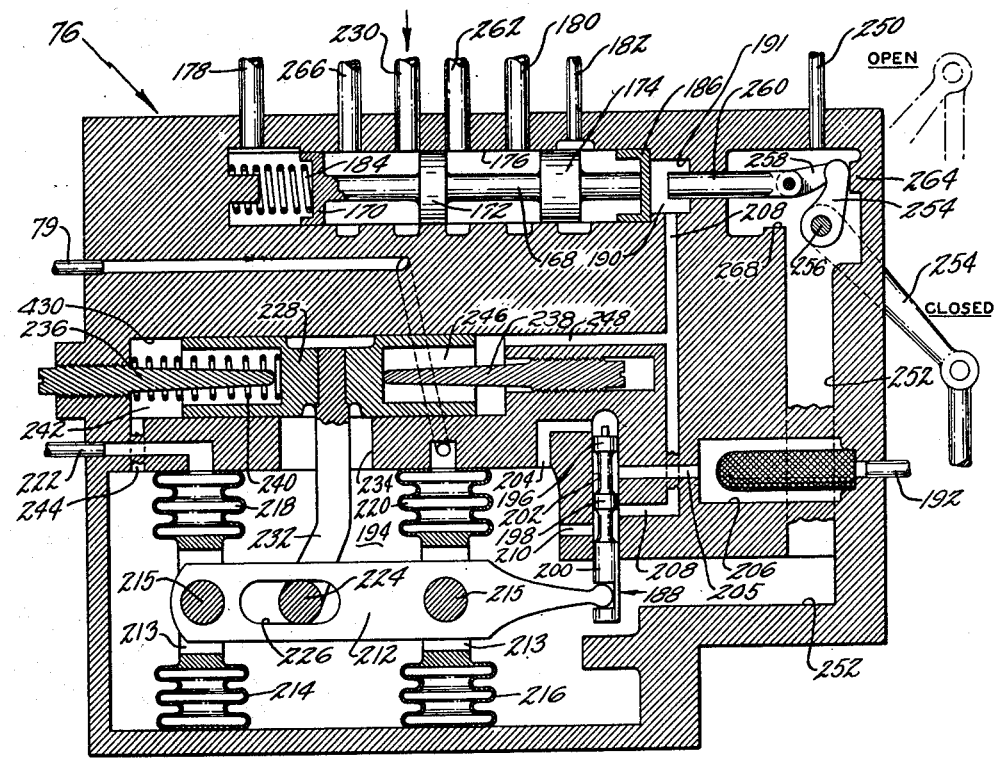
Fig. 2 is an enlarged schematic view of the exhaust nozzle actuator control.

With reference to Fig. 6, this modified control connects pressures to the exhaust nozzle actuating cylinders 130 either to open or to close the nozzle as required in the same manner as the control in Fig. 2. A pilot valve 272 connects chamber 190 either with line 192 which supplies a source of fluid pressure or with conduit 274 which is connected to drain. The pilot valve 272 is also constructed in the same manner as the pilot valve in Fig. 2. However, the cylinder bore 202 in which the pilot valve 272 moves axially has a different arrangement of passages connected thereto. Starting from the top in Fig. 6 there are, a passage 204 which is connected at its other end to chamber 194, a passage 205 which is connected at its other end to a chamber 206 which is in turn connected to passage 192, passage 208 which is connected at its other end to chamber 190, and a passage 276 which is connected at its other end to conduit 274.

Pilot valve 272 is connected at its lower end to one end of a walking beam 212 located in chamber 194. Walking beam 212 is attached differently from the walking beam in Fig. 2 as it is connected near each end by only one bellows. Each bellows is attached by a bifurcated member 278 through which the walking beam passes and is pivotally attached by a pin 215.

In this view there are also shown restraining means for walking beam 212. Bearing faces 602 and 604 are formed on each end of said walking beam and engage anti-friction bearings 606 and 608, respectively, to prevent translation yet allow rotative movement of said walking beam. These bearings, 606 and 608, are mounted on pins 610 within the housing. While these means are only shown in this view they are equally applicable in Figs. 2, 4 and 7.

As mentioned before in relation to Fig. 2, pressures at different stations along the flow path of the gases through the power plant are used by the control to sense combustion within the afterburner and to regulate the propelling nozzle accordingly. The stations shown are the compressor inlet pressure which is connected by conduit 222 to bellows 218, and the turbine discharge pressure which is connected by conduit 79 to chamber 194. Bellows 270 is evacuated.

The fulcrum shift piston and associated mechanism for moving and controlling movable fulcrum 224 is the same as shown in Fig. 2. However, in this modification the chamber 242 is connected to passage 276 by passage 277 instead of being connected to chamber 194 as in Fig. 2. Chamber 194 is also closed off from passage 252 and 250. This modified control operates in the same manner as the control shown in Fig. 2.

With reference to Fig. 7, this measuring device is a modification of the actuating mechanism of the control as shown in Figs. 2 and 6. While shown with a four bellows arrangement as shown in Fig. 4, a two bellows arrangement as shown in Fig. 6 may be used. This modification consists essentially of changing the porting of pilot valve 188a so that an increase in the ratio of absolute pressures, $P_2/P_1$, results in a low pressure in passage 300, and a decrease in the ratio results in an increase of pressure in passage 300. This is done by having passage 205, the passage carrying high pressure, enter bore 202 below passage 300 and having passage 510, the passage carrying low pressure, enter bore 202 above passage 300. Passage 300 is now connected only to the chamber 246 at the right end of the fulcrum shift piston 228.

Equation 3 may be transposed (4) $$\left(\frac{P_2}{P_1}\right)_{null} = \frac{a}{b}\left(\frac{A_1}{A_2}\right)$$

For a particular bellows area ratio $A_1/A_2$, the product $a/b$ $(A_1/A_2)$ is determined by the position of fulcrum 224. So, for every position of fulcrum 224 there exists a pressure ratio which obtains at the "null" position of the pilot valve 188a.

When the ratio $P_2/P_1$ of the applied absolute pressures is less than the ratio required to bring the pilot valve 188a to its "null" position at the value of $a/b$ resulting from a given position of fulcrum 224, the pilot valve 188a will be displaced upwards to port high pressure from passage 205 through passage 300 to urge the fulcrum shift piston 228 to the left against spring 240, consequently decreasing the ratio of $a/b$. As the piston moves the fulcrum to the left, the ratio of $a/b$ approaches the value corresponding to the "null" position of the pilot valve 188a at the applied pressure ratio, and the piston comes to rest when the "null" position is reached. In a like manner, an increase in the pressure ratio causes the fulcrum bar 224 to move to the right until the pilot valve 188a is again returned to its "null" position.

Thus, for any pressure ratio, the fulcrum shift piston 228 will move to position the fulcrum 224 in accordance with said ratio. Accordingly, some mechanism may be attached to the piston for a control or for measurement. In Fig. 7 an indicating device is shown. A rack 302 is positioned by a rod 304 attached to said piston. This rack drives gear 306 which will attain some angular position according to the pressure ratio. This gear 306 is connected by a rod 308 to an indicating hand 310 which indicates pressure ratio directly on a calibrated scale 312.

While in the following operational disclosure the control 78 is described as being connected to compressor inlet pressure ($P_2$ in Fig. 2 and Fig. 6) and turbine discharge pressure ($P_6$ in Fig. 2 and Fig. 6) the actuating mechanism of the control operates similarly for any two pressures chosen. However, the shape and relative positions of curves A, B and C in Fig. 3 will vary depending upon what stations are used for the ratio $P_2/F_1$.

Operation

Afterburner operation is initiated by placing switch 94 in its "on" position. This movement turns the temperature control amplifier on which in turn opens a normally closed solenoid operated shut-off valve in the fuel meter and sends a signal to the afterburner fuel meter for attenuating fuel flow therethrough. This movement of the switch also places motor operated valve 68 in open position, starts the fuel booster pump 48 and opens normally closed solenoid actuated shut-off valve 82.

The operation of the fuel booster pump forces fuel from the fuel tank 46 through conduits 54 and 56 to the impeller 70 of the fuel pump 50. The opening of the motor operated valve 68 allows compressed air to be directed from the outlet of the engine compressor 4 through conduits 230, 64 and 66 against turbine 58 to drive the impeller 70. The impeller 70 then delivers fuel to the afterburner fuel meter 52. This fuel meter 52 meters fuel as a function of compressor pressure rise and under the influence of the temperature control amplifier and this fuel passes by a normally closed solenoid shut-off valve, which is now open, through conduit 74 to the fuel nozzles 26.

The opening of the normally closed solenoid actuated shut-off valve 82 permits a source of fuel to be supplied to the igniter 28 through conduit 80. The pressure of the fuel in conduit 74 is transferred to the igniter by conduit 84 which pressure permits fuel which has passed normally closed solenoid actuated valve 82 to be injected from the igniter into a combustion chamber 8. Ignition of the injected fuel results in flame propagation through the turbine to the tail pipe resulting in ignition in the afterburner of the fuel being introduced through nozzles 26.

As the afterburner ignites, the exhaust nozzle actuator control 76 has its moving parts approximately in the positions shown in Fig. 2 (these positions also hold for the control shown in Fig. 6); compressor inlet pressure admitted to bellows 218 through conduit 222 and turbine discharge pressure admitted to bellows 220 through conduit 79 positioning pilot valve 188 so that land 198 opens entrance to 208 to 210 and closes off the entrance to conduit 208 from conduit 205, spring 184 biasing relay valve 168 to the right thereby directing compressed air from conduit 230 to conduit 266 and connecting conduit 180 to conduit 262 to maintain nozzle 44 in its closed position, and spring 240 biasing fulcrum shift piston to the right against the "nozzle opening" adjustment screw 238 thereby positioning the movable fulcrum 224 to the right. At this point in the sequence of operation with the engine operating in the afterburner operating range the ratio of $P_6/P_2$ is found on curve B (see Fig. 3), the curve marked "afterburner off with nozzle closed." With fulcrum 224 in its right-hand position this ratio is less than that required, line X, to move the pilot valve from the last described position and the nozzle remains closed. It is necessary, in order for the nozzle to be opened, to obtain a ratio of $P_6/P_2$ above a value represented by line X, a value which is determined by the position of the "nozzle opening" adjustment screw 238.

The ignition of fuel within the afterburner results in an increase in turbine exhaust gas pressure above that normally obtained without afterburning. With the engine operating in the afterburner operating range the start of the afterburning raises the value of $P_6$ so that the ratio of $P_6/P_2$ is found on curve A (see Fig. 3), which in this range is above line X. This increase in turbine exhaust gas pressure is transmitted to bellows 220 thereby increasing the pressure in this bellows causing its end of the walking beam 212 to move down, thereby moving pilot valve 188 down and connecting passage 208 to passage 204 admitting the actuating fluid from conduit 192 to pass into chamber 190 and move relay valve 168 to the left against spring 184 and connect conduit 230 to conduit 262 to direct compressed air to the side of the cylinders which will cause the nozzle 44 to open and also connect conduit 266 to conduit 178. As the actuating fluid in passage 208 passes to chamber 190, it is directed by passage 248 into chamber 246 and moves the fulcrum shift piston 228 to the left against the "nozzle closing" adjustment screw 236 so that the pressure resulting from the opening of the exhaust nozzle 44 will now be sufficient to maintain the pilot valve 188 in its down position. When the nozzle opens, the ratio of $P_6/P_2$ moves down to curve B (see Fig. 3) marked "afterburner on with nozzle open" and with fulcrum 224 in its left position this ratio is now enough to maintain the nozzle in its open position. The pressure in this conduit 262 is transmitted by conduit 98 to a normally closed pressure switch 96 in the electrical line to the normally closed solenoid actuated shut-off valve 82 which opens said switch thereby closing the shut-off valve 82 preventing a flow of fuel to the igniter 28.

To intentionally cease operation of the afterburner the afterburner switch 94 is turned to its "off" position. This turns the temperature control amplifier 86 off thereby turning off a supply of current to a normally closed solenoid operated shut-off valve in the fuel meter and the normally closed solenoid actuated shut-off valve 82 in conduit 80. The movement of the switch to the "off" position also closes the motor operated valve 68 and turns off the afterburner fuel booster pump 48. It will be seen that with the fuel pump 50 and fuel booster pump 48 off line 192 loses its pressure thereby permitting spring 184 to move relay valve 168 to the right and connect conduit 230 to conduit 266 to direct compressed air to the side of the cylinders which will cause the nozzle to close and also connect conduit 262 to conduit 180. While the afterburner has been described as intentionally turned off, the following disclosure holds for the operation when the combustion in the afterburner ceases unintentionally leaving the afterburner fuel system on. At this point in the sequence of operation with the engine still in the afterburner operating range the ratio of $P_6/P_2$ is found on curve C (see Fig. 3) marked "afterburner off and nozzle open." With fulcrum 224 in its left position this ratio is not enough to maintain the nozzle in its open position since the ratio is at a value below the valve represented by line Y, a value which is determined by the position of the "nozzle closing" adjustment screw 236. This decrease in afterburner pressure is transmitted to bellows 220 thereby decreasing the pressure in this bellows causing its end of the walking beam 212 to move up, thereby moving pilot valve 188 up so that land 198 closes off the entrance to passage 208 from passage 205. This movement also connects passage 208 to passage 210 so that the fluid in chambers 190 and 246 will be connected to chamber 194 permitting this fluid to be forced into the fluid in chamber 194 by the spring force applied on each end of relay valve 168 and fulcrum piston 228. This action permits both the relay valve 168 and fulcrum piston 228 to move to the right. This places the control 76 in the position it was in before afterburning was initiated, with relay valve 168 being biased to the right directing compressed air from conduit 230 to conduit 266 to close nozzle 44 and maintain it closed and connecting conduit 262 to conduit 180. Now with the nozzle closed the ratio $P_6/P_2$ moves up to curve B (see Fig. 3) marked "afterburner off with nozzle closed." With fulcrum 224 in its right position this ratio is now enough to maintain the nozzle in its closed position. This reduction of pressure in conduit 262 is conveyed to normally closed pressure switch 96 by conduit 98 thereby permitting the switch to be closed to permit current to pass to valve 82 upon the next starting of the afterburner.

Although a specific control device has been shown and described herein for purpose of illustration, it will be evident to those skilled in the art that the invention is ca-

I claim:

1. A device for directing a fluid pressure from one conduit to one of two other conduits, including an inlet conduit and a first outlet conduit and a second outlet conduit, a relay valve for connecting said inlet conduit to said first outlet conduit or said second outlet conduit, a fourth conduit connected at one end to a chamber at one end of said relay valve, a pilot valve connected to the other end of said fourth conduit for connecting said fourth conduit to a drain conduit or to a pressure conduit, a spring biasing said relay valve in a direction towards said chamber, a walking beam attached to said pilot valve for moving it, said walking beam having a movable fulcrum, a shift piston mounted in a bore, said fulcrum being mounted on an arm fixed to said shift piston, a fifth conduit connecting said fourth conduit to a second chamber at one end of said shift piston, and a spring biasing said shift piston in a direction towards said second chamber.

2. An instrument to sense whether a ratio of two absolute pressures is more than or less than a predetermined value, comprising: a housing, a fulcrum mounted in said housing, a lever mounted on said fulcrum, first evacuated bellows means affixed at one end to said housing and at the other end to said lever at a point other than the fulcrum, first vented bellows means affixed at one end to said housing and at the other end at a point on the lever other than the fulcrum, a first fluid pressure, a first conduit connecting first fluid pressure to the interior of first vented bellows, a second evacuated bellows affixed at one end to said housing and at the other end to said lever at a point on the lever other than the fulcrum, a second vented bellows affixed at one end to said housing and at the other end to a point on the lever other than the fulcrum, a second fluid pressure, a second conduit connecting second fluid pressure to the interior of second vented bellows, an ambient fluid pressure surrounding said first, second, third, and fourth bellows, said first and second vented bellows, fulcrum, and lever being so located that the moment applied to the lever about said fulcrum by the first fluid pressure in first vented bellows is equal and opposite the moment applied to the lever about the fulcrum by second fluid pressure in second vented bellows, said first evacuated bellows, first vented bellows, fulcrum, and lever being so located that the moment applied to the lever about said fulcrum by the ambient pressure around first evacuated bellows is equal and opposite to the moment applied to the lever about the fulcrum by the ambient pressure around first vented bellows, said second evacuated bellows, second vented bellows, fulcrum, and lever being so located that the moment applied to the lever about the fulcrum by the ambient pressure around second evacuated bellows is equal and opposite to the moment applied to the lever about the fulcrum by the ambient pressure around second vented bellows, and means actuated by rotation of said lever about said fulcrum to sense rotation of said lever one way or another from its equilibrium position relative to said housing corresponding to a predetermined ratio of the absolute pressure in first conduit to the absolute pressure in second conduit.

3. An instrument to sense whether a ratio of two absolute pressures is more than or less than a predetermined value, comprising: a housing, a fulcrum mounted in said housing, a lever mounted on said fulcrum, first evacuated bellows means affixed at one end to said housing and at the other end to said lever at a point other than the fulcrum, first vented bellows means affixed at one end to said housing and at the other end at a point on the lever other than the fulcrum, a first fluid pressure, a first conduit connecting first fluid pressure to the interior of first vented bellows, a second evacuated bellows affixed at one end to said housing and at the other end to said lever at a point on the lever other than the fulcrum, a second vented bellows affixed at one end to said housing and at the other end to a point on the lever other than the fulcrum, a second fluid pressure, a second conduit connecting second fluid pressure to the interior of second vented bellows, an ambient fluid pressure surrounding said first, second, third, and fourth bellows, said first and second vented bellows, fulcrum, and lever being so located that the moment applied to the lever about said fulcrum by the first fluid pressure in first vented bellows is equal and opposite the moment applied to the lever about the fulcrum by second fluid pressure in second vented bellows, said first evacuated bellows, first vented bellows, fulcrum, and lever being so located that the moment applied to the lever about said fulcrum by the ambient pressure around first evacuated bellows is equal and opposite to the moment applied to the lever about the fulcrum by the ambient pressure around first vented bellows, said second evacuated bellows, second vented bellows, fulcrum and lever being so located that the moment applied to the lever about said fulcrum by the ambient pressure around second evacuated bellows is equal and opposite to the moment applied to the lever about the fulcrum by the ambient pressure around second vented bellows, means actuated by rotation of said lever about said fulcrum to sense rotation of said lever one way or another from its equilibrium position relative to said housing corresponding to a predetermined ratio of the absolute pressure in first conduit to the absolute pressure in second conduit, said first vented bellows and first evacuated bellows being so located in relation to the housing and lever that no net moment is applied to the lever about its fulcrum by mechanical resilience of said two bellows, said second vented bellows and second evacuated bellows being so located in relation to the housing and lever that no net moment is applied to the lever about its fulcrum by mechanical resilience of said two bellows.

4. An instrument to sense whether a ratio of two absolute pressures is more than or less than a predetermined value, comprising: a housing, a fulcrum mounted in said housing, a lever mounted on said fulcrum, first evacuated bellows means affixed at one end to said housing and at the other end to said lever at a point other than the fulcrum, first vented bellows means affixed at one end to said housing and at the other end at a point on the lever other than the fulcrum, a first fluid pressure, a first conduit connecting first fluid pressure to the interior of first vented bellows, a second evacuated bellows affixed at one end to said housing and at the other end to said lever at a point on the lever other than the fulcrum, a second vented bellows affixed at one end to said housing and at the other end to a point on the lever other than the fulcrum, a second fluid pressure, a second conduit connecting second fluid pressure to the interior of second vented bellows, an ambient fluid pressure surrounding said first, second, third, and fourth bellows, said first and second vented bellows, fulcrum, and lever being so located that the moment applied to the lever about said fulcrum by the first fluid pressure in first vented bellows is equal and opposite the moment applied to the lever about the fulcrum by second fluid pressure in second vented bellows, said first evacuated bellows, first vented bellows, fulcrum and lever being so located that the moment applied to the lever about said fulcrum by the ambient pressure around first evacuated bellows is equal and opposite to the moment applied to the lever about the fulcrum by the ambient pressure around first vented bellows, said second evacuated bellows, second vented bellows, fulcrum, and lever being so located that the moment applied to the lever about said fulcrum by the ambient pressure around second evacuated bellows is equal and opposite to the moment applied to the lever about the fulcrum by the ambient pressure around second vented bellows, means actuated by rotation of said lever about said fulcrum to sense rotation of said lever one way or another from its equilibrium position relative to said housing corresponding to a predetermined ratio of the absolute pressure in first conduit to the absolute pressure in second conduit, and said first vented bellows and first evacuated bellows being so located in relation to the housing and lever that no net moment is applied to the lever about its fulcrum by mechanical resilience of said two bellows, said second vented bellows and second evacuated bellows being so located in relation to the housing and lever that no net moment is applied to the lever about its fulcrum by mechanical resilience of said two bellows, said means consisting of a valve movable in said housing to control admittance of an operating fluid from a third conduit to a fourth conduit in the housing.

5. A control device providing an output mechanical motion as a unique function of the ratio of two absolute pressures forming an input, comprising in combination: a housing, a first bore in said housing, a piston slidable in said first bore, a fulcrum movable by said piston, a lever mounted on said fulcrum, restraining means preventing translation of said lever relative to said housing when said fulcrum is moved relative to said lever and said housing, first evacuated bellows means affixed at one end to said housing and at the other end to said lever at a point other than the fulcrum, first vented bellows means affixed at one end to said housing and at the other end at a point on the lever other than the fulcrum, a first fluid pressure, a first conduit connecting first fluid pressure to the interior of first vented bellows, a second evacuated bellows affixed at one end to said housing and at the other end to said lever at a point on the lever other than the fulcrum, a second vented bellows affixed at one end to said housing and at the other end to a point on the lever other than the fulcrum, a second fluid pressure, a second conduit connecting second fluid pressure to the interior of second vented bellows, an ambient fluid pressure surrounding said first, second, third, and fourth bellows, said first and second vented bellows, fulcrum, and lever being so located that the moment applied to the lever about said fulcrum by the first fluid pressure in first vented bellows is equal and opposite the moment applied to the lever about the fulcrum by second fluid pressure in second vented bellows, said first evacuated bellows, first vented bellows, fulcrum, and lever being so located that the moment applied to the lever about said fulcrum by the ambient pressure around first evacuated bellows is equal and opposite to the moment applied to the lever about the fulcrum by the ambient pressure around first vented bellows, said second evacuated bellows, second vented bellows, fulcrum, and lever being so located that the moment applied to the lever about said fulcrum by the ambient pressure around second evacuated bellows is equal and opposite to the moment applied to the lever about the fulcrum by the ambient pressure around second vented bellows, a second bore in said housing, valve means movable within said second bore, operative connection between said valve means and said lever whereby rotation of said lever about said fulcrum causes said valve means to move in said bore, conduit means connecting the second bore to said first bore, an operating fluid supply to said second bore, an operating fluid drain from said second bore, porting means between said valve means and said second bore so that displacement of said valve means in one way from a null position causes the said piston to move said fulcrum in one direction and displacement of said valve means in an opposite way from a null position causes said piston to move said fulcrum in an opposite direction.

6. A control device providing an output mechanical motion as a unique function of the ratio of two absolute pressures forming an input, comprising in combination: a housing, a first bore in said housing, a piston slidable in said first bore, a fulcrum movable by said piston, a lever mounted on said fulcrum, restraining means preventing translation of said lever relative to said housing when said fulcrum is moved relative to said lever and said housing, first evacuated bellows means affixed at one end to said housing and at the other end to said lever at a point other than the fulcrum, first vented bellows means affixed at one end to said housing and at the other end at a point on the lever other than the fulcrum, a first fluid pressure, a first conduit connecting first fluid pressure to the interior of first vented bellows, a second evacuated bellows affixed at one end to said housing and at the other end to said lever at a point on the lever other than the fulcrum, a second vented bellows affixed at one end to said housing and at the other end to a point on the lever other than the fulcrum, a second fluid pressure, a second conduit connecting second fluid pressure to the interior of second vented bellows, an ambient fluid pressure surrounding said first, second, third, and fourth bellows, said first and second vented bellows, fulcrum, and lever being so located that the moment applied to the lever about said fulcrum by the first fluid pressure in first vented bellows is equal and opposite the moment applied to the lever about the fulcrum by second fluid pressure in second vented bellows, said first evacuated bellows, first vented bellows, fulcrum, and lever being so located that the moment applied to the lever about said fulcrum by the ambient pressure around first evacuated bellows is equal and opposite to the moment applied to the lever about the fulcrum by the ambient pressure around first vented bellows, said second evacuated bellows, second vented bellows, fulcrum, and lever being so located that the moment applied to the lever about said fulcrum by the ambient pressure around second evacuated bellows is equal and opposite to the moment applied to the lever about the fulcrum by the ambient pressure around second vented bellows, a second bore in said housing, valve means movable within said second bore, operative connection between said valve means and said lever whereby rotation of said lever about said fulcrum causes said valve means to move in said bore, conduit means connecting the second bore to said first bore, an operating fluid supply to said second bore, an operating fluid drain from said second bore, porting means between said valve means and said second bore so that displacement of said valve means in one way from a null position causes the said piston to move said fulcrum in one direction and displacement of said valve means in an opposite way from a null position causes said piston to move said fulcrum in an opposite direction, said first vented bellows and first evacuated bellows being so located in relation to the housing and lever that no net moment is applied to the lever about its fulcrum by mechanical resilience of said two bellows, said second vented bellows and second evacuated bellows being so located in relation to the housing and lever that no net moment is applied to the lever about its fulcrum by mechanical resilience of said two bellows.

7. A control device providing an output mechanical motion as a unique function of the ratio of two absolute pressures forming an input, comprising in combination: a housing, a first bore in said housing, a piston slidable in said first bore, a fulcrum movable by said piston, a lever mounted on said fulcrum, restraining means preventing translation of said lever relative to said housing when said fulcrum is moved relative to said lever and said housing, first evacuated bellows means affixed at one end to said housing and at the other end to said lever at a point other than the fulcrum, first vented bellows means affixed at one end to said housing and at the other end at a point on the lever other than the fulcrum, a first fluid pressure, a first conduit connecting first fluid pressure to the interior of first vented bellows, a second evacuated bellows affixed at one end to said housing and at the other end to said lever at a point on the lever other than the fulcrum, a second vented bellows affixed at one end to said housing and at the other end to a point on the lever other than the fulcrum, a second fluid pressure, a second conduit connecting second fluid pressure to the interior of second vented bellows, an ambient fluid pressure surrounding said first, second, third, and fourth bellows, said first and second vented bellows, fulcrum, and lever being so located that the moment applied to the lever about said fulcrum by the first fluid pressure in first vented bellows is equal and opposite the moment applied to the lever about the fulcrum by second fluid pressure in second vented bellows, said first evacuated bellows, first vented bellows, fulcrum, and lever being so located that the moment applied to the lever about said fulcrum by the ambient pressure around first evacuated bellows is equal and opposite to the moment applied to the lever about the fulcrum by the ambient pressure around first vented bellows, said second evacuated bellows, second vented bellows, fulcrum, and lever being so located that the moment applied to the lever about said fulcrum by the ambient pressure around second evacuated bellows is equal and opposite to the moment applied to the lever about the fulcrum by the ambient pressure around second vented bellows, a second bore in said housing, valve means movable within said second bore, operative connection between said valve means and said lever whereby rotation of said lever about said fulcrum causes said valve means to move in said bore, conduit means connecting the second bore to said first bore, an operating fluid supply to said second bore, an operating fluid drain from said second bore, porting means between said valve means and said second bore so that displacement of said valve means in one way from a null position causes the said piston to move said fulcrum in one direction and displacement of said valve means in an opposite way from a null position causes said piston to move said fulcrum in an opposite direction, said first vented bellows and first evacuated bellows being so located in relation to the housing and lever that no net moment is applied to the lever about its fulcrum by mechanical resilience of said two bellows, said second vented bellows and second evacuated bellows being so located in relation to the housing and lever that no net moment is applied to the lever about its fulcrum by mechanical resilience of said two bellows, a locus for motion of the fulcrum relative to the lever such that with the lever at the position corresponding to the null position of the valve means movement of the fulcrum relative to the lever does not impose torque upon the lever about the fulcrum from mechanical resilience of any bellows.

8. A control device providing an output mechanical motion as a unique function of the ratio of two absolute pressures forming an input, comprising in combination: a housing, a first bore in said housing, a piston slidable in said first bore, a fulcrum movable by said piston, a lever mounted on said fulcrum, restraining means preventing translation of said lever relative to said housing when said fulcrum is moved relative to said lever and said housing, first evacuated bellows means affixed at one end to said housing and at the other end to said lever at a point other than the fulcrum, first vented bellows means affixed at one end to said housing and at the other end at a point on the lever other than the fulcrum, a first fluid pressure, a first conduit connecting first fluid pressure to the interior of first vented bellows, a second evacuated bellows affixed at one end to said housing and at the other end to said lever at a point on the lever other than the fulcrum, a second vented bellows affixed at one end to said housing and at the other end to a point on the lever other than the fulcrum, a second fluid pressure, a second conduit connecting second fluid pressure to the interior of second vented bellows, an ambient fluid pressure surrounding said first, second, third, and fourth bellows, said first and second vented bellows, fulcrum, and lever being so located that the moment applied to the lever about said fulcrum by the first fluid pressure in first vented bellows is equal and opposite the moment applied to the lever about the fulcrum by second fluid pressure in second vented bellows, said first evacuated bellows, first vented bellows, fulcrum, and lever being so located that the moment applied to the lever about said fulcrum by the ambient pressure around first evacuated bellows is equal and opposite to the moment applied to the lever about the fulcrum by the ambient pressure around first vented bellows, said second evacuated bellows, second vented bellows, fulcrum, and lever being so located that the moment applied to the lever about said fulcrum by the ambient pressure around second evacuated bellows is equal and opposite to the moment applied to the lever about the fulcrum by the ambient pressure around second vented bellows, a second bore in said housing, valve means movable within said second bore, operative connection between said valve means and said lever whereby rotation of said lever about said fulcrum causes said valve means to move in said bore, conduit means connecting the second bore to said first bore, an operating fluid supply to said second bore, an operating fluid drain from said second bore, porting means between said valve means and said second bore so that displacement of said valve means in one way from a null position causes the said piston to move said fulcrum in one direction and displacement of said valve means in an opposite way from a null position causes said piston to move said fulcrum in an opposite direction, said first vented bellows and first evacuated bellows being so located in relation to the housing and lever that no net moment is applied to the lever about its fulcrum by mechanical resilience of said two bellows, said second vented bellows and second evacuated bellows being so located in relation to the housing and lever that no net moment is applied to the lever about its fulcrum by mechanical resilience of said two bellows, a locus for motion of the fulcrum relative to the lever such that with the lever at the position corresponding to the null position of the valve means movement of the fulcrum relative to the lever does not impose torque upon the lever about the fulcrum from mechanical resilience of any bellows, an operative relation between the lever, bellows and fulcrum such that an increase in the ratio of the first fluid absolute pressure to the second fluid absolute pressure applies a torque unbalance to said lever causing it to rotate about said fulcrum and move the valve means in said one way causing piston to move the fulcrum in said one direction which direction decreases the torque unbalance applied to the lever.

9. A control device providing an output mechanical motion as a unique function of the ratio of two absolute pressures forming an input, comprising in combination: a housing, a first bore in said housing, a piston slidable in said first bore, a fulcrum movable by said piston, a lever mounted on said fulcrum, restraining means preventing translation of said lever relative to said housing when said fulcrum is moved relative to said lever and said housing, first evacuated bellows means affixed at one end to said housing and at the other end to said lever at a point other than the fulcrum, first vented bellows means affixed at one end to said housing and at the other end at a point on the lever other than the fulcrum, a first fluid pressure, a first conduit connecting first fluid pressure to the interior of first vented bellows, a second evacuated bellows affixed at one end to said housing and at the other end to said lever at a point on the lever other than the fulcrum, a second vented bellows affixed at one end to said housing and at the other end to a point on the lever other than the fulcrum, a second fluid pressure, a second conduit connecting second fluid pressure to the interior of second vented bellows, an ambient fluid pressure surrounding said first, second, third, and fourth bellows, said first and second vented bellows, fulcrum, and lever being so located that the moment applied to the lever about said fulcrum by the first fluid pressure in first vented bellows is equal and opposite the moment applied to the lever about the fulcrum by second fluid pressure in second vented bellows, said first evacuated bellows, first vented bellows, fulcrum, and lever being so located that the moment applied to the lever about said fulcrum by the ambient pressure around first evacuated bellows is equal and opposite to the moment applied to the lever about the fulcrum by the ambient pressure around first vented bellows, said second evacuated bellows, second vented bellows, fulcrum, and lever being so located that the moment applied to the lever about said fulcrum by the ambient pressure around second evacuated bellows is equal and opposite to the moment applied to the lever about the fulcrum by the ambient pressure around second vented bellows, a second bore in said housing, valve means movable within said second bore, operative connection between said valve means and said lever whereby rotation of said lever about said fulcrum causes said valve means to move in said bore, conduit means connecting the second bore to said first bore, an operating fluid supply to said second bore, an operating fluid drain from said second bore, porting means between said valve means and said second bore so that displacement of said valve means in one way from a null position causes the said piston to move said fulcrum in one direction and displacement of said valve means in an opposite way from a null position causes said piston to move said fulcrum in an opposite direction, said first vented bellows and first evacuated bellows being so located in relation to the housing and lever that no net moment is applied to the lever about its fulcrum by mechanical resilience of said two bellows, said second vented bellows and second evacuated bellows being so located in relation to the housing and lever that no net moment is applied to the lever about its fulcrum by mechanical resilience of said two bellows, a locus for motion of the fulcrum relative to the lever such that with the lever at the position corresponding to the null position of the valve means movement of the fulcrum relative to the lever does not impose torque upon the lever about the fulcrum from mechanical resilience of any bellows, an operative relation between the lever, bellows and fulcrum such that an increase in the ratio of the first fluid absolute pressure to the second fluid absolute pressure applies a torque unbalance to said lever causing it to rotate about said fulcrum and move the valve means in said one way causing piston to move the fulcrum in said one direction which direction decreases the torque unbalance applied to the lever, and pressure ratio indicating means actuated by said piston.

10. A control device responsive to whether a ratio of two absolute pressures is more than a first value or less than a second value said second value being less than said first value, comprising in combination: a housing, a first bore in said housing, a piston slidable in said first bore, a fulcrum movable by said piston, a lever mounted on said fulcrum, restraining means preventing translation of said lever relative to said housing when said fulcrum is moved relative to said lever and said housing, first evacuated bellows means affixed at one end to said housing and at the other end to said lever at a point other than the fulcrum, first vented bellows means affixed at one end to said housing and at the other end at a point on the lever other than the fulcrum, a first fluid pressure, a first conduit connecting first fluid pressure to the interior of first vented bellows, a second evacuated bellows affixed at one end to said housing and at the other end to said lever at a point on the lever other than the fulcrum, a second vented bellow affixed at one end to said housing and at the other end to a point on the lever other than the fulcrum, a second fluid pressure, a second conduit connecting second fluid pressure to the interior of second vented bellows, an ambient fluid pressure surrounding said first, second, third, and fourth bellows, said first and second vented bellows, fulcrum, and lever being so located that the moment applied to the lever about said fulcrum by the first fluid pressure in first vented bellows is equal and opposite the moment applied to the lever about the fulcrum by second fluid pressure in second vented bellows, said first evacuated bellows, first vented bellows, fulcrum, and lever being so located that the moment applied to the lever about said fulcrum by the ambient pressure around first evacuated bellows is equal and opposite to the moment applied to the lever about the fulcrum by the ambient pressure around first vented bellows, said second evacuated bellows, second vented bellows, fulcrum, and lever being so located that the moment applied to the lever about said fulcrum by the ambient pressure around second evacuated bellows is equal and opposite to the moment applied to the lever about the fulcrum by the ambient pressure around second vented bellows, a second bore in said housing, valve means movable within said second bore, operative connection between said valve means and said lever whereby rotation of said lever about said fulcrum causes said valve means to move in said bore, conduit means connecting the second bore to said first bore, an operating fluid supply to said second bore, an operating fluid drain from said second bore, porting means between said valve means and said second bore so that displacement of said valve means in one way from a null position causes the said piston to move said fulcrum in one direction and displacement of said valve means in an opposite way from a null position causes said piston to move said fulcrum in an opposite direction, said first vented bellows and first evacuated bellows being so located in relation to the housing and lever that no net moment is applied to the lever about its fulcrum by mechanical resilience of said two bellows, said second vented bellows and second evacuated bellows being so located in relation to the housing and lever that no net moment is applied to the lever about its fulcrum by mechanical resilience of said two bellows, a locus for motion of the fulcrum relative to the lever such that with the lever at the position corresponding to the null position of the valve means movement of the fulcrum relative to the lever does not impose torque upon the lever about the fulcrum from mechanical resilience of any bellows, an operative relation between the lever, bellows and fulcrum such that an increase in the ratio of the first fluid absolute pressure to the second fluid absolute pressure applies a torque unbalance to said lever causing it to rotate about said fulcrum and move the valve means in said one way causing piston to move the fulcrum in said one direction which direction increases the torque unbalance applied to the lever.

11. A control device responsive to whether a ratio of two absolute pressures is more than a first value or less than a second value said second value being less than said first value, comprising in combination: a housing, a first bore in said housing, a piston slidable in said first bore, a fulcrum movable by said piston, a lever mounted on said fulcrum, restraining means preventing translation of said lever relative to said housing when said fulcrum is moved relative to said lever and said housing, first evacuated bellows means affixed at one end to said housing and at the other end to said lever at a point other than the fulcrum, a first vented bellows means affixed at one end to said housing and at the other end at a point on the lever other than the fulcrum, a first fluid pressure, a first conduit connecting first fluid pressure to the interior of first vented bellows, a second evacuated bellows affixed at one end to said housing and at the other end to said lever at a point on the lever other than the fulcrum, a second vented bellows affixed at one end to said housing and at the other end to a point on the lever other than the fulcrum, a second fluid pressure, a second conduit connecting second fluid pressure to the interior of second vented bellows, an ambient fluid pressure surrounding said first, second, third, and fourth bellows, said first and second vented bellows, fulcrum, and lever being so located that the moment applied to the lever about said fulcrum by the first fluid pressure in first vented bellows is equal and opposite the moment applied to the lever about the fulcrum by second fluid pressure in second vented bellows, said first evacuated bellows, first vented bellows, fulcrum, and lever being so located that the moment applied to the lever about said fulcrum by the ambient pressure around first evacuated bellows is equal and opposite to the moment applied to the lever about the fulcrum by the ambient pressure around first vented bellows, said second evacuated bellows, second vented bellows, fulcrum, and lever being so located that the moment applied to the lever about said fulcrum by the ambient pressure around second evacuated bellows is equal and opposite to the moment applied to the lever about the fulcrum by the ambient pressure around second vented bellows, a second bore in said housing, valve means movable within said second bore, operative connection between said valve means and said lever whereby rotation of said lever about said fulcrum causes said valve means to move in said bore, conduit means connecting the second bore to said first bore, an operating fluid supply to said second bore, an operating fluid drain from said second bore, porting means between said valve means and said second bore so that displacement of said valve means in one way from a null position causes the said piston to move said fulcrum in one direction and displacement of said valve means in an opposite way from a null position causes said piston to move said fulcrum in an opposite direction, said first vented bellows and first evacuated bellows being so located in relation to the housing and lever that no net moment is applied to the lever about its fulcrum by mechanical resilience of said two bellows, said second vented bellows and second evacuated bellows being so located in relation to the housing and lever that no net moment is applied to the lever about its fulcrum by mechanical resilience of said two bellows, a locus for motion of the fulcrum relative to the lever such that with the lever at the position corresponding to the null position of the valve means movement of the fulcrum relative to the lever does not impose torque upon the lever about the fulcrum from mechanical resilience of any bellows, an operative relation between the lever, bellows and fulcrum such that an increase in the ratio of the first fluid absolute pressure to the second fluid absolute pressure applies a torque unbalance to said lever causing it to rotate about said fulcrum and move the valve means in said one way causing piston to move the fulcrum in said one direction which direction increases the torque unbalance applied to the lever, and first and second adjustment means to limit travel of the piston in first and second directions.

12. A device for controlling a fluid pressure in a conduit, including a conduit, a pilot valve slidable in a bore, a fluid pressure source, a second conduit connecting said source to said bore, a fluid drain, a third conduit connecting said drain to said bore, said first named conduit being connected to said bore, said pilot valve having two annuli with a land in between, said annuli being operable to connect said first named conduit to the second or third conduit, said land being operable to disconnect said first named conduit from the third or second conduit, a chamber, a walking beam in said chamber, said walking beam being attached near each end between two bellows, said walking beam being connected to said pilot valve to actuate said valve, a passage for connecting one bellows to a pressure source, a second passage for connecting another bellows to a pressure source, a fulcrum, said walking beam having a slot for receiving said fulcrum.

13. A pressure responsive control device comprising a housing having a chamber therein, a pilot valve, a first conduit connected to said pilot valve for directing a pressurized fluid thereto, a second conduit connected to said pilot valve for directing a fluid therefrom, a third conduit connected to said pilot valve for connection with said first or second conduit, a movable fulcrum mounted in said chamber, a walking beam mounted on said movable fulcrum, first pressure responsive means connected to one end of said walking beam and second pressure responsive means connected to said walking beam adjacent its other end, said walking beam being connected to said pilot valve for controlling it, a shift piston slidably mounted in a bore, means connecting said fulcrum to said piston for moving said fulcrum, a fourth conduit connecting said third conduit to one end of said bore, and means biasing said shift piston in a direction towards the end of said bore connected to said fourth conduit.

14. A pressure responsive control device comprising a housing having a chamber therein, a pilot valve, a first conduit connected to said pilot valve for directing a pressurized fluid thereto, a second conduit connected to said pilot valve for directing a fluid therefrom, a third conduit connected to said pilot valve for connection with said first or second conduit, a movable fulcrum mounted in said chamber, a walking beam mounted on said movable fulcrum, first pressure responsive means connected to one end of said walking beam and second pressure responsive means connected to said walking beam adjacent its other end, said walking beam being connected to said pilot valve for controlling it, a shift piston slidably mounted in a bore, means connecting said fulcrum to said piston for moving said fulcrum, a fourth conduit connecting said third conduit to one end of said bore, means biasing said shift piston in a direction towards the end of said bore connected to said fourth conduit, and adjustable means for limiting the length of travel of said shift piston in its bore.

15. A pressure responsive control device comprising a housing having a chamber therein, a pilot valve, a first conduit connected to said pilot valve for directing a pressurized fluid thereto, a second conduit connected to said pilot valve for directing a fluid therefrom, a third conduit connected to said pilot valve for connection with said first or second conduit, a movable fulcrum mounted in said chamber, a walking beam mounted on said movable fulcrum, first pressure responsive means connected to one end of said walking beam and second pressure responsive means connected to said walking beam adjacent its other end, said walking beam being connected to said pilot valve for controlling it, a shift piston slidably mounted in a bore, means connecting said fulcrum to said piston for moving said fulcrum, a fourth conduit connecting said third conduit to one end of said bore, means biasing said shift piston in a direction towards the end of said bore connected to said fourth conduit, a relay valve for connecting a fifth inlet conduit to a sixth outlet conduit or seventh outlet conduit, and means for moving said relay valve in response to a fluid pressure in the third conduit.

References Cited in the file of this patent

UNITED STATES PATENTS

| | | |
|---|---|---|
| 1,199,036 | Hodgkinson | Sept. 19, 1916 |
| 1,880,727 | Blood | Oct. 4, 1932 |
| 1,987,505 | Edler | Jan. 8, 1935 |
| 2,125,949 | O'Conner | Aug. 9, 1938 |
| 2,146,176 | Donaldson | Feb. 7, 1939 |
| 2,250,344 | Alkan | July 22, 1941 |
| 2,285,540 | Stein | June 9, 1942 |
| 2,373,167 | Cherry | Apr. 10, 1945 |
| 2,454,038 | Crever | Nov. 16, 1948 |
| 2,480,621 | Warner | Aug. 30, 1949 |
| 2,516,449 | Coates | July 25, 1950 |
| 2,521,477 | Pellettere | Sept. 5, 1950 |
| 2,625,136 | Moog | Jan. 13, 1953 |
| 2,677,233 | Jordan | May 4, 1954 |
| 2,683,349 | Lawrence | July 13, 1954 |
| 2,687,273 | Starkey | Aug. 24, 1954 |

FOREIGN PATENTS

| | | |
|---|---|---|
| 587,558 | Great Britain | May 7, 1947 |